United States Patent [19]

Schreckenberg et al.

[11] Patent Number: 4,735,721
[45] Date of Patent: Apr. 5, 1988

[54] POLYETHER-COPOLYCARBONATES FOR DIALYSIS MEMBRANES

[75] Inventors: Manfred Schreckenberg; Rolf Dhein; Ralf Lange, all of Krefeld; Werner Waldenrath, Cologne, all of Fed. Rep. of Germany

[73] Assignee: Bayer Aktiengesellschaft, Leverkusen, Fed. Rep. of Germany

[21] Appl. No.: 840,179

[22] Filed: Mar. 17, 1986

Related U.S. Application Data

[62] Division of Ser. No. 654,585, Sep. 26, 1984, Pat. No. 4,607,070.

[30] Foreign Application Priority Data

Sep. 30, 1983 [DE] Fed. Rep. of Germany ....... 3335591
Mar. 10, 1984 [DE] Fed. Rep. of Germany ....... 3408804

[51] Int. Cl.⁴ .............................................. B01D 13/00
[52] U.S. Cl. ..................................... 210/500.4; 264/41
[58] Field of Search ..................... 210/500.4; 524/100; 264/41

[56] References Cited

U.S. PATENT DOCUMENTS

| | | | |
|---|---|---|---|
| Re. 30,856 | 1/1982 | Highley et al. ....................... 264/41 |
| 3,875,112 | 4/1975 | Böckmann et al. ............... 260/47 X |
| 3,945,926 | 3/1976 | Kesting .............................. 40/500.4 |
| 4,054,597 | 10/1977 | Krimm et al. ....................... 260/463 |
| 4,169,868 | 10/1979 | Schreckenberg et al. ........... 525/439 |
| 4,217,437 | 7/1980 | Schreckenberg et al. ........... 528/171 |
| 4,260,537 | 4/1981 | Limbert ....................... 260/45.85 B |
| 4,281,101 | 7/1981 | Schreckenberg et al. ........... 528/196 |
| 4,333,809 | 6/1982 | Schreckenberg et al. ..... 204/159.14 |
| 4,374,959 | 2/1983 | Loucks et al. ....................... 525/394 |
| 4,400,491 | 8/1983 | Käfer et al. .......................... 525/439 |
| 4,607,070 | 8/1986 | Schreckenberg et al. ..... 210/646 X |

FOREIGN PATENT DOCUMENTS

4415433 7/1969 Japan .

Primary Examiner—Frank Spear
Attorney, Agent, or Firm—Gene Harsh; Joseph C. Gil; Aron Preis

[57] ABSTRACT

The present invention is directed to a process for the preparation of a segmented, aliphatic-aromatic polyether-copolycarbonate containing structural units conforming to

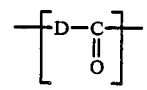

wherein —D— is a diphenolate radical and units conforming to

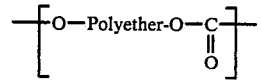

wherein —O—Polyether—O— is an aliphatic polyether-diolate radical, by the phase boundary process in which aliphatic polyether diol and a mixture of dihydroxy compounds are reacted with a carbonic acid halide which is employed in molar excess in relation to the dihydroxy compounds and in which the aqueous phase is kept at a pH value of at least 13 and where the polycondensation reaction is carried out in a reactor by addition of an amine catalyst.

The invention is further directed to the polyether polycarbonate which is obtained by the process and to the preparation of membranes from said polyether copolycarbonate.

4 Claims, No Drawings

POLYETHER-COPOLYCARBONATES FOR DIALYSIS MEMBRANES

This application is a division of application Ser. No. 654,585 filed Sept. 26, 1984, U.S. Pat. No. 4,607,070.

The present invention relates to a process for the preparation of segmented, aliphatic-aromatic polyether-copolycarbonates with an $\overline{M}w$ (weight-average) of 50,000 to 350,000, preferably 100,000 to 250,000, and containing about 95% by weight to about 65% by weight of aromatic carbonate structural units of the formula (I)

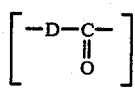   (I)

wherein —D— is a diphenolate radical with preferably 12 to 30 C atoms, and in particular 12 to 24 C atoms, and about 5% by weight to about 35% by weight of polyether-carbonate structural units of the formula (II)

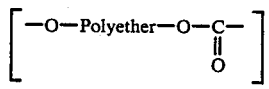   (II)

wherein —O— Polyether—O— is an aliphatic polyether-diolate radical with an an $\overline{M}m$ of 600 to 20,000, preferably 4000 to 10,000, and, if appropriate, also aryl carbonate structural units of the formula (III)

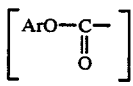   (III)

wherein Ar is a carbocyclic, aromatic radical with preferably 6 to 16 C atoms,, by the phase boundary process in a mixture of organic solvent and aqueous alkaline phase at temperatures from 0° C. to 35° C., preferably 10° C. to 20° C., from corresponding amounts of aliphatic polyether-diols with an $\overline{M}n$ of 600 to 20,000, preferably 4000 to 10,000, diphenols, carbonic acid halides and, if appropriate, monophenolic chain stoppers, which is characterised in that (a) a carbonic acid halide is employed in a molar excess of preferably 70 to 200 mol %, based on the number of mol of organic dihydroxy compounds, and the diphenols to be employed consist of 50% by weight to 99% by weight, preferably of 70% by weight to 98% by weight and in particular 80% by weight to 95% by weight, of bisphenol A and of 50% by weight to 1% by weight, preferably 30% by weight to 2% by weight and in particular 20% by weight to 5% by weight, of other diphenols, (b) the aqueous phase is kept at a pH value of at least 13 and (c) the polycondensation reaction is carried out in a reactor by addition of an amine catalyst,
the polyether-polycarbonate being purified, isolated and dried via the organic phase in a known manner.

The direct incorporation of aliphatic polyetherdiols in the preparation of high molecular weight, aliphatic-aromatic polycarbonates by the solution process was hitherto effected only in a homogeneous phase system by the so-called pyridine process (see, for example, U.S. Pat. No. 4,160,791), whilst, if the two-phase boundary process is used, the aliphatic OH groups of the polyethers must first be converted into more reactive end groups (see, for example, Eugene Goldberg, Journal of Polymer Science, Part C. No. 4, pages 707–730, in particular 719, 1964; and German Auslegeschrift No. 1,162,559, German Offenlegungsschrift No. 2,636,783, German Offenlegungsschrift No. 2,619,831, German Offenlegungsschrift No. 2,636,784, German Offenlegungsschrift No. 2,650,533, German Offenlegungsschrift 2,726,416, German Offenlegungsschrift No. 2,827,325, German Offenlegungsschrift No. 2,837,526, European Offenlegungsschrift No. 0,004,020, German Offenlegungssrhrift No. 2,930,787 and German Offenlegungsschrift No. 3,120,594).

Although the possibility of direct incorporation by the two-phase boundary process is also indicated in the literature (see U.S. Pat. No. 3,161,616, column 6, lines 7–12, U.S. Pat. No. 3,030,335, column 5, lines 49–54 and Japanese Patent Publication No. 44-15433 from Asahi Chem. Ind. (Application No. 41-33532)), further details on the amount of phosgene and the pH values to be maintained are lacking in these publications. Canadian Patent Specification No. 715,142 (Example 8) discloses that, in a special reaction procedure, mixed aliphatic-aromatic hydroxy compounds are incorporated into the polycarbonate formation, also together with their aliphatic OH groups, by the phase boundary process, whilst, according to German Offenlegungsschrift No. 2,119,775, only aromatic OH groups are incorporated into the polycarbonate formation by the phase boundary process at pH values of 8 to 13.5, preferably 12 to 13.

According to German Offenlegungsschrift No. 2,446,107, aliphatic or aliphatic-aromatic polycarbonates with molecular weights of 400 to 20,000 and OH end groups are prepared by the phase boundary process using 30 to 50% strength aqueous alkaline solutions. However, polyetherglycols of higher molecular weight are not included here. The phosgene is used in excess (see Examples 1 and 3 of German Offenlegungsschrift No. 2,446,107).

The polyether-polycarbonates which can be obtained by the process according to the invention occasionally exhibit aging phenomena on storage. This manifests itself, for example, in a smell of formaldehyde or in a change in the viscosity of the material. To prevent this aging, the polyether-polycarbonates obtainable according to the invention can be stabilised by addition of 10 to 1000 ppm, preferably 50 to 500 ppm, based on the weight of the polyether-polycarbonates, of a phenolic stabiliser.

The stabiliser can be added after the polycondensation and during working up, and is preferably added after the product has been washed with distilled water. The nature of the addition is not critical, it is only necessary to ensure uniform distribution of the stabiliser. This is best effected by dissolving the stabiliser in a solvent, for example $CH_2Cl_2$, and adding it in this form to the solution of the polyether-polycarbonate.

The present invention thus also relates to the additional step of the preparation process described above, which is characterised in that (d) after the polycondensation, but before the isolation of the polyether-copolycarbonate, a phenolic stabiliser is added in amounts of 10 to 1000 ppm, preferably 50 to 500 ppm, based on the weight of the polyether-copolycarbonate.

According to "Goldberg, loc. cit., pages 715, 716 and 726", the addition of antioxidants gives only moderate success in respect of the stability of polyetherpolycarbonate films 6-10 mils (~150 to 250 μm) thick at temperatures of 100° C. to 150° C. U.S. Pat. Nos. 3,161,615 (column 12, line 4) and 3,030,335 (column 8, line 38) merely mention the possibility of adding a stabiliser. Stabilisation against the effect of UV light and against hydrolysis is described in the abovementioned German Offenlegungsschriften Nos. 2,636,783, 2,636,784, 2,726,416 and 2,827,325, whilst the possibility of stabilisation against the effect of moisture, heat and UV light is merely mentioned in German Offenlegungsschrift No. 3,120,594.

The polyether-copolycarbonates which can be obtained by the process carried out according to the invention, with or without the addition of a stabiliser, are outstandingly suitable in the form of membranes about 10 μm to about 50 μm thick, preferably about 15 μm to about 30 μm thick, for dialysis, ultrafiltration and reverse osmosis and can be used, for example, in medicine for purification of blood.

The present invention thus also relates to the preparation of polyether-copolycarbonate membranes 10 μm to 50 μm thick, preferably 15 μm to 30 μm thick, as an additional step in the preparation process described above, which is characterised in that, with or without inclusion of step (d), (e) the polyether-polycarbonates obtainable according to the invention are dissolved in water-miscible organic solvents in amounts of 1 to 20% by weight, based on the weight of solution, and, after filtration, are cast on a smooth surface in a known manner to films with a wet coating thickness of about 150 μm to about 240 μm, and, after some of the solvent has been evaporated off, these films are hydrated several times in demineralised water.

In our opinion, membranes about 10 μm to about 50 μm thick of the polyether-copolycarbonates in question have not hitherto been described in the literature.

Although films of polyether-copolycarbonates (see, for example, U.S. Pat. Nos. 3,161,615 and 3,030,335 and German Offenlegungsschriften Nos. 2,636,784, 2,636,783, 2,726,416 and 2,827,325 as well as European Offenlegungsschrift No. 4,020) and the use of polyether-copolycarbonate films for medical packaging (see German Offenlegungsschrift No. 2,907,951 and German Offenlegungsschrift No. 2,930,787) are known, film thicknesses are only disclosed in the last two literature references, these being in each case at least 100 μm (see German Offenlegungsschrift No. 2,907,951, page 19, and German Offenlegungsschrift No. 2,930,787, page 44).

On the other hand, films and membranes of polyether-polycarbonates in which the polycarbonate content is built up only from bisphenol A are known from the literature (see, for example, Journal of Polymer Science, Part C, No. 4, pages 707-730 (loc. cit.), German Offenlegungsschrift No. 2,152,256, U.S. Pat. No. 4,160,791, U.S. Pat. No. 4,075,108, German Offenlegungsschrift No. 2,510,337, German Offenlegungsschrift No. 2,711,498, U.S. Pat. No. 4,069,151, German Offenlegungsschrift No. 2,713,283, German Patent Specification No. 2,921,138, German Offenlegungsschrift 2,932,737, German Offenlegungsschrift 2,932,761, European Published Appliications No. 46,816 and No. 46,817, and R. E. Kesting, J. Macromol Sci. Chem., A4(3), pages 655 to 664, May 1970, E. Chiellini et al., Informations Chimie, No. 176, pages 221 and 222, April 1978 and B. H. Barbour et al., Vol. XXI, Trans. Amer. Soc. Artif. Int. Organs, 1975, pages 144 to 155).

Membranes of polyether-polycarbonates in which the carbonate content can be built up from two different diols, that is to say an aromatic diol and a cycloaliphatic diol, are known only from German Offenlegungsschrift No. 2,251,066 (see pages 7, 8, 9 and 26 of German Offenlegungsschrift No. 2,251,066).

In our opinion, polyether-copolycarbonate membranes based on two different diphenols are not described expressis verbis in German Offenlegungsschrift No. 2,251,066.

The present invention thus furthermore relates to the polyether-copolycarbonate membranes which can be obtained by the process according to the invention and which may or may not be also provided with a phenolic stabiliser.

The stabilisation of polyether-polycarbonate films with a maximum thickness of about 50 μm with phenolic stabilisers is not mentioned in the literature; rather, storage in a stabilising agent is recommended for thin films of this type, that is to say for polyether-polycarbonate membranes (see German Offenlegungsschriften No. 2,510,337 (page 13), No. 2,711,498 (page 17), No. 2,713,283 (page 17), No. 2,932,761 (page 6) and European Offenlegungsschriften No. 46,816 (page 12) and No. 46,817 (page 8)).

The use of polyether-polycarbonate membranes for dialysis is already known (see, for example, R. E. Kesting, J. Macromol. Sci.-Chem, A4(3), pages 655 to 664, May 1970; E. Chiellini et al., Informations Chimie No. 176, pages 221 to 222, April 1978 and B. H. Barbour et al., Vol. XXI, Trans. Amer. Soc. Artif. Int. Organs, 1975, pages 144 to 155). The use of polyether-polycarbonate membranes for ultrafiltration and for reverse osmosis is likewise known (see, for example, German Offenegungsschrift No. 2,932,737, page 7).

The use of the polyether-copolycarbonate membranes which can be obtained according to the invention for dialysis, ultrafiltration and reverse osmosis is based on the good combination of properties of the membranes, which combine good permeability to Vitamin $B_{12}$, transparency and improved bursting strength, facilitating better exclusion rates and overall shorter dialysis times. The membranes are also free from undesirable pyridine residues, their characteristics hardly vary and they have a relatively low crystallisation tendency.

The present invention thus also relates to the use of the polyether-copolycarbonate membranes obtainable by the process according to the invention for dialysis, ultrafiltration and reverse osmosis.

The processes known hitherto for the preparation of polyether-polycarbonate membranes have disadvantages in respect of the industrial preparation of polyether-polycarbonates for membranes.

The disadvantage of the process in homogeneous solution for the preparation of polyether-polycarbonates is the complete removal of pyridine, which, as is known, is used in molar amounts for the preparation in homogeneous solution. However, this purification is important, on the one hand because the dialysis membranes come into contact with blood, and on the other hand for improving the stability of the polyether-polycarbonates and the membranes prepared therefrom (see also German Offenlegungsschrift No. 2,251,066, page 24, and German Auslegeschrift No. 2,932,737).

The utilisation of the phase boundary process was hitherto possible only if the aliphatic polyethers were converted into polyethers with reactive chlorocarbonic acid ester or phenolic end groups, which have the disadvantage that such polyether-polycarbonates prepared by multi-stage processes have wider ranges of variation in the property tolerances.

Since the membranes of cellulose hydrate or cellulose acetate hitherto used in practice have poorer permeabilities than polyether-polycarbonate membranes in respect of substances with average molecular weights $\overline{M}n$ of about 300 to about 5000, there was thus a need to prepare polyether-polycarbonate membranes with a good combination of properties, as described above, on an industrial scale in a simple and reliable manner.

A forced circulation mixer, for example, can be used as the reactor for carrying out the polyether-polycarbonate preparation according to the invention.

Working up of the polyether-polycarbonate prepared according to the invention is started by first removing the alkaline phase. The product is then washed with dilute phosphoric acid, and later with distilled water until free from electrolytes.

Working up can be effected by distilling off the solvent in a forced circulation mixer and grinding the product, or by customary concentration of the solution and grinding of the product, or by spray-evaporation of the solution, or by precipitation of the polyether-polycarbonate from solution in hot water, the organic solvent being distilled off, or by precipitation from solution with organic precipitants.

The polyether-polycarbonate is then dried in a vacuum drying cabinet or with air or nitrogen.

Suitable organic solvents for the polyether-polycarbonate preparation according to the invention are those known for thermoplastic polycarbonates, such as, for example, methylene chloride, chloroform, ethylene chloride, 1,2-dichloropropane, toluene, chlorobenzene or mixtures thereof.

Suitable basic compounds for the preparation of the aqueous alkaline phase are solutions of LiOH, NaOH, KOH, Ca(OH)$_2$ and/or Ba(OH)$_2$ in water.

Suitable catalysts for the polycondensation are the tertiary aliphatic amine catalysts known for polycarbonate synthesis, such as trimethylamine, triethylamine, n-tripropylamine, n-tributylamine or N-ethylpiperidine; if appropriate, the known quaternary ammonium salts, such as, for example, tetrabutylammonium bromide, can also be used.

The volume of aqueous alkaline phase is preferably the same as that of the entire organic phase. However, the alkaline phase can also be greater or smaller in volume than the entire organic phase. The preferred pH range of the aqueous phase is pH 13-14, a pH of 14 being particularly preferred.

Carbonic acid halides, such as, for example, phosgene or COBr$_2$, in particular phosgene, are used in a known manner as carbonate donors for the polyether-polycarbonate preparation according to the invention.

The particular reactant ratio of bisphenols to polyethers to be employed depend on the hydrophilic polyether content and the content of hydrophobic aromatic carbonate units to be achieved, reaction of the reactants being quantitative.

Other diphenols which are to be used according to the invention in combination with bisphenol A are bis-(hydroxyphenyl)-alkanes other than bisphenol A, dihydroxydiphenyls, bis-(hydroxyphenyl)-cycloalkanes, bis-(hydroxyphenyl) sulphides, bis (hydroxyphenyl)-ethers, bis-(hydroxyphenyl) sulphones and α,α-bis-(hydroxyphenyl)-diisopropylbenzenes, and nuclear-alkylated compounds thereof.

Other diphenols which can be used according to the invention are, in particular, those of the formula (IV)

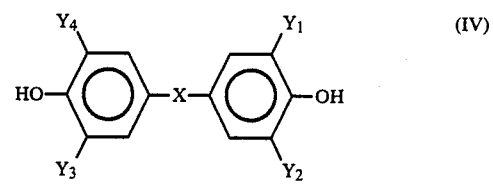

wherein
X denotes a single bond,

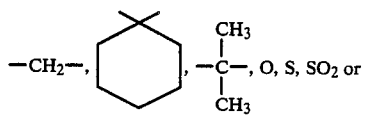

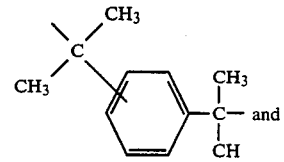

$Y_1$ to $Y_4$ are identical or different and denote hydrogen or $C_1$–$C_4$-alkyl, preferably H or methyl, it also being possible for X to be 2,2-isopropylidene if at least one radical Y is an alkyl substituent.

Examples of other suitable diphenols are
2,4-bis-(4-hydroxyphenyl)-2-methylbutane,
1,1-bis-(4-hydroxyphenyl)-cyclohexane,
α,α-bis-(4-hydroxyphenyl)-p-diisopropylbenzene,
2,2-bis-(3-methyl-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl) sulphone,
2,4-bis-(3,5-dimethyl-4-hydroxyphenyl)-2-methylbutane,
1,1-bis-(3,5-dimethyl-4-hydroxyphenyl)-cyclohexane and
α,α-bis-(3,5-dimethyl-4-hydroxyphenyl)-p-diisopropylbenzene.

Preferred other diphenols are 1,1-bis-(4-hydroxyphenyl)-cyclohexane and 2,2-bis-(3,5-dimethyl-4-hydroxyphenyl)-propane.

The other diphenols to be employed can be combined with 2,2-bis-(4-hydroxyphenyl)-propane either by themselves or as mixtures of several.

Polyether-diols which are to be used according to the invention are preferably polyethylene glycols, such as those of Union Carbide (Carbowax(®)), British Petroleum (BP) (Breox®), Hoechst (Polyglykol®) and Hüls (Polywachs®), with molecular weights $\overline{M}n$ (number-average average molecular weight) of 600 to 20,000, preferably 4000 to 10,000, a narrow molecular weight distribution also being preferred. ($\overline{M}n$ is calculated in the known manner by determination of the OH number).

Apart from the commercially available polyethylene glycols mentioned, it is also possible to use, according to the invention, other aliphatic polyethers containing OH groups, for example polyethylene/polypropylene oxide glycols or polybutylene oxide glycols with molecular weights $\overline{M}n$ (number-average molecular weight) of 600 to 20,000, preferably 4000 to 10,000, $\overline{M}n$ being calculated as described above.

Chain stoppers which can be used are the phenols which can usually be employed, such as, for example, phenol and p-tert.-butylphenol. The amount of chain stopper is determined by the particular molecular weight to be established in the particular polyether-polycarbonates to be prepared, on the basis of quantitative conversion of the reactants.

The high molecular weight polyether-copolycarbonates prepared by the process according to the invention should have average molecular weights $\overline{M}w$ (weight-average) of 50,000 to 350,000, preferably 100,000 to 250,000, determined by the light scattering method with a light scattering photometer. The relative solution viscosities $\eta_{rel}$ (measured on solutions of 0.5 g in 100 ml of $CH_2Cl_2$ at 25° C.) of the high molecular weight polyether-polycarbonates obtained by the process according to the invention are between 1.5 and 3.8, preferably between 1.6 and 3 and in particular between 2.0 and 2.8.

The polyether-copolycarbonates should preferably be composed of about 70% by weight to 90% by weight of carbonate structural units of the formula (I) and 10% by weight to 30% by weight of polyether-carbonate structural units of the formula (II) and, if appropriate, also aryl carbonate structural units of the formula (III).

Examples of suitable phenolic stabilisers for carrying out the process according to the invention are 4-methoxyphenol, 3-tert.-butyl-methoxyphenol, 2-tert.-butyl-4-methoxyphenol, 4-phenoxyphenol, 2-phenoxyphenol, 2,6-di-tert.-butyl-4-methylphenol, 3-(3,5-di-tert.-butyl-4-hydroxyphenyl)-propionate (Irganox ®1010), 1,6-hexanediol bis-3-(3,5-di-tert.-butyl-4-hydroxyphenyl)-propionate (Irganox ®259), triethylene glycol bis-3-(tert.-butyl-4-hydroxy-5-methylphenyl)-propionate (Irganox ®245) and 1,3,5-tris-(4-tert.-butyl-3-hydroxy-2,5-dimethylbenzyl)-1,3,5-triazine-2,4,6-(1H,3H,5H)-trione (Cyanox ®1790)

Particularly preferred stabilisers are: 3-tert.-butyl-4-methoxyphenol, 2-tert.-butyl-4-methoxyphenol, 2,6-di-tert.-butyl-4-methylphenol, 3-(3,5-di-tert.-butyl-4-hydroxyphenyl)-propionate and 1,3,5-tris-(4-tert.-butyl(3-hydroxy-2,5-dimethylbenzyl)-1,3,5-triazine-2,4,6(1H,3H,5H)-trione.

The stabilisers can be used by themselves or as mixtures with one another.

Preferred phenolic stabilisers are sterically hindered phenols.

Examples of water-miscible organic solvents which are suitable for the preparation of the membranes are 1,3-dioxolane, 1,3-dioxane, 1,4-dioxane, tetrahydrofuran, γ-butyrolactone, acetonitrile, dimethylformamide and dimethylsulphoxide, and mixtures of these solvents. Glass plates or polymer films, for example, can serve as the smooth surfaces.

After casting of the membranes, these are stored, either at room temperature or at a temperature above room temperature, during which some of the solvent can evaporate. To prepare the finished membrane, the film, which still contains solvent, is then hydrated several times, for example 4 to 6 times, in demineralised water over a period of 1 to 2 hours.

The polyether-copolycarbonate membranes obtainable by the process according to the invention are essentially tested for their usefulness by first determining their transparency by preparing a solution of about 8 to 15% by weight of polyether-polycarbonate in 1,3-dioxolane. Films with a wet coating thickness of 150 to 240 μm are then drawn on a glass plate. Thereafter, the films are placed in water after intervals of 30 seconds, 1.7 minutes and 2.5 minutes. If they are to show good permeabilities as dialysis membranes, the membranes thus prepared must be transparent and clear. Their permeability for Vitamin $B_{12}$, the rate of ultrafiltration and their bursting strength are then determined.

As already mentioned, the polyether-polycarbonate membranes, with or without a phenolic stabiliser, obtainable according to the invention are suitable for dialysis, such as, for example, haemodialysis or sequential dialysis, ultrafiltration, such as, for example, haemofiltration, removal of pyrogens and plasmaphoresis, and reverse osmosis.

In ultrafiltration, the membranes can be used for removing water or aqueous solutions or for enriching substances dissolved as macromolecules or suspensions, for demineralisation, for fractionation or for separation of molecules of high or low molecular weight. They can thus be used, for example, for working up biological substances, that is to say, for example, enzymes, hormones, nucleic acids and other proteins, or for the preparation of clinical samples for analysis, or for removal of pyrogens, viruses and bacteria, or for the isolation of metabolism products from fermentation processes, or for electrophoresis or immunoelectrophoresis.

In the examples which follow, the investigations by gel chromatography are carried out in tetrahydrofuran using Styragel columns (separation range $1 \times 10^3$Å, $1 \times 10^4$Å, $1 \times 10^5$Å and $1 \times 10^6$Å) at room temperature. The calibration of bisphenol A polycarbonate was used for the determination. No wide deviations were found in comparison with the $\overline{M}w$ determination by the light-scattering method.

Comparison experiment according to U.S. Pat. No. 4,160,791 (pyridine process)

Preparation of a polyether-polycarbonate of 72% by weight of 2,2-bis-(4-hydroxyphenyl)-propane polycarbonate, 5% by carbonate and 23% by weight of polyethylene oxide glycol Gaseous phosgene is passed, at a rate of 570 ml/minute, into a solution of 336.7 g of 2,2-bis-(4-hydroxyphenyl)-propane (bisphenol A), 23.7 g of 1,1-bis-(4-hydroxyphenyl)-cyclohexane, 120 g of polyethylene glycol of average molecular weight $\overline{M}n$ 8,000, 384 ml (4.77 mol) of pyridine and 2,700 ml of methylene chloride, with vigorous stirring. The temperature is kept at 25±0.5° C. with an ice-water bath. After 90 minutes, crystals of pyridine hydrochloride form. A solution of 0.25 g of phenol in 12 ml of methylene chloride is now added. Further phosgene is passed in at the same rate until a stable slightly pink coloration of the reaction solution has formed, indicating the end of the reaction (a further 70 minutes). The polymer formed is then precipitated by stirring the very viscous reaction mixture with a solution of 5,178 ml of acetone, 1,290 ml of water and 198 ml concentrated hydrochloric acid. The gelatinous precipitate is then processed with hot water in a mixer to give a solid/water mixture, which is then transferred to a filter and washed with hot water. After drying at 50° C. in vacuo, 470 g of a white copolymer are obtained. Analysis by IR spectroscopy shows that the polymer has a polyether content of 22.7 % by weight and a polycarbonate content 77.3% by weight, and a relative viscosity $\eta_{rel}$ of 1.99. According to investigation by gel chromatography, the polymer has an $\overline{M}w$ of 137,900 and an $\overline{M}n$ of 37,040, and an H of 2.72.

$$H = (\overline{M}w/\overline{M}n) - 1).$$

EXAMPLE 1

Preparation of a polyether-polycarbonate of 23% by weight of polyethylene oxide glycol ($\overline{M}n$ 8,000), 72% by weight of 2,2-bis-(4-hydroxyphenyl)-propane polycarbonate and 5% by weight of 1,1-bis-(4-hydroxyphenyl)-cyclohexane polycarbonate 35 liters of distilled water, 1.94 kg of 2,2-bis-(4-hydroxyphenyl)-propane (bisphenol A), 0.137 kg of 1,1-bis-(4-hydroxyphenyl)-cyclohexane and 1.5 kg of 50% strength sodium hydroxide solution are initially introduced into a stirred kettle, with intensive stirring and under a nitrogen atmosphere. 35 liters of methylene chloride and 0.69 kg of polyethylene oxide glycol with an average molecular weight $\overline{M}n$ of 8,000 are added to this solution. The mixture is then stirred until all of the polyether has dissolved. 2.245 kg of phosgene (150 mol % excess of phosgene, based on the bisphenols) are now passed in at 15° C. in the course of 100 minutes, whilst about 3.3 liters of 50% strength sodium hydroxide solution are simultaneously metered in, the pH being kept constant at 14. When the phosgene has been passed in, 20 liters of methylene chloride and 10.27 g of N-ethylpiperidine (1 mol % of amine, based on the bisphenols) are added. The mixture is then stirred for a further hour. The organic phase is separated off via a separator, washed successively with 2% strength phosphoric acid, if necessary with addition of a demulsifier, and finally with distilled water, until free from electrolytes. After removal of the water, the organic solution is concentrated and the polyether-polycarbonate is then dried off in a vacuum drying cabinet at 50° C.

The polyether-polycarbonate isolated has a relative viscosity $\eta_{rel}$ of 2.41.

According to the investigation by gel chromatography, all of the polyether is incorporated in the cocondensate.

According to this investigation, the polymer has the following parameters: $\overline{M}w$ 228,500; $\overline{M}n$ 18,300.

$$H = (\overline{M}w/\overline{M}n) - 1 = 11.48$$

IR analysis shows that the polymer consists of 22.7% of polyether and 77.3% of aromatic polycarbonates.

EXAMPLE 2

Preparation of a polyether-polycarbonate of 23% by weight of polyethylene oxide glycol ($\overline{M}n$ 6,000), 72% by weight of 2,2-bis-(4-hydroxyohenyl)-propane polycarbonate and 5% by weight of 1,1-bis-(4-hydroxyphenyl)-cyclohexane poly- carbonate 7.45 liters of distilled water, 0.715 liters of 50% strength sodium hydroxide solution, 1.94 kg of 2,2-bis-(4-hydroxyphenyl)-propane (bisphenol A) and 0.137 kg of 1,1-bis-(4-hydroxyphenyl)-cyclohexane are introduced into a stirred kettle, with intensive stirring and under a nitrogen atmosphere. After the bisphenols have been suspended, 5.1 liters of methylene chloride and 0.690 kg of polyethylene oxide glycol of average molecular weight $\overline{M}n$ 6,000 are added. The mixture is then stirred until all of the polyether has dissolved. 2.245 kg of phosgene (150 mol % excess of phosgene, based on the bisphenols) are now passed in at 15° C. in the course of 100 minutes, whilst about 3.6 liters of 50% strength sodium hydroxide solution are simultaneously metered in, the pH kept constant at 14.

The reaction mixture is introduced into a forced circulation mixer and a solution of 10.27 g N-ethylpiperidine (1 mol % of amine, based on the bisphenols) and 100 ml of methylene chloride are added. After about 45 minutes, a higher molecular weight product is obtained, with the pH being kept constant at 14. The reaction mixture is processed to a paste-like mass for a further 30 minutes, if necessary with the addition of methylene chloride.

The alkaline, aqueous phase is then drained off and washed with distilled water until the pH is 10. The paste is now washed twice with dilute phosphoric acid in the forced circulation mixer. It is then washed with distilled water until the product is free from electrolytes. Towards the end of the washing operation, the product breaks up into beads, methylene chloride evaporating. The polyether-polycarbonate can then be ground and dried for 24 hours in a vacuum drying cabinet or with air or nitrogen at 50°–60° C.

The polyether-polycarbonate thus isolated has a relative viscosity $\eta_{rel}$ of 2.72.

According to analysis by gel chromatography, the polyether is completely incorporated in the cocondensate. According to this investigation, the polymer has an $\overline{M}w$ of 228,600; $\overline{M}n$ of 21,430 and $$H = (\overline{M}w/\overline{M}n) - 1 = 9.67$$

IR analysis shows that the polymer consists of 22.8% by weight of polyether and 77.2% by weight of aromatic polycarbonate.

EXAMPLE 3

Preparation of a polyether-polycarbonate of 19% by weight of polyethylene oxide glycol ($\overline{M}n$ 8,000), 76% by weight of 2,2-bis-(4-hydroxyphenyl)-propane polycarbonate and 5% by weight of 1,1-bis-(4-hydroxyphenyl)-cyclohexane polycarbonate 7.45 liters distilled water, 0.75 liters of 50% strength sodium hydroxide solution, 2.047 kg of 2,2-bis-(4-hydroxyphenyl)-propane (bisphenol A), 0.137 kg of 1,1-bis-(4-hydroxyphenyl)-cyclohexane and 6 g of p-tert.butylphenol, as a chain stopper, are initially introduced into a stirred kettle, with intensive stirring and under a nitrogen atmosphere. After the bisphenols have been suspended, 5.1 liters of methylene chloride and 0.57 kg of polyethylene oxide glycol with an average molecular weight of $\overline{M}n$ 8,000 are added. The mixture is then stirred until all of the polyether has dissolved. 2.36 kg of phosgene (150 mol % excess, based on the bisphenols) are now passed in at 15° C. in the course of 100 minutes, whilst about 3.8 liters of 50% strength sodium hydroxide solution are simultaneously metered in, the pH being kept constant at 14. The reaction mixture is introduced into a forced circulation mixer and a solution of 10.8 g of N-ethylpiperidine and 100 ml of methylene chloride is added. After about 45 minutes, a high molecular weight product is obtained, with the pH kept constant at 14. Further working up of the copolymer is effected according to Example 2.

The polyether-polycarbonate isolated has a relative viscosity $\eta_{rel}$ of 2.42.

According to analysis by gel chromatography, the polyether is completely incorporated in the cocondensate. According to this investigation, the polymer has the following parameters: $\overline{M}w$ 182,900; $\overline{M}n$ 45,840.

$$H = (\overline{M}w/\overline{M}n - 1 = 2.9$$

IR analysis shows that the polymer consists of 8.8% by weight of polyether and 81.2% by weight of aromatic polycarbonate.

EXAMPLE 4

Preparation of a polyether-polycarbonate of 19% by weight of polyethylene oxide glycol ($\overline{M}n$ 8,000), 76% by weight of 2,2-bis-(4-hydroxyphenyl)-propane polycarbonate and 5% by weight of 2,2-bis-(3,5-dimethyl-4-hydroxyphenyl)-propane polycarbonate 7.45 liters of distilled water, 0.75 liter of 50% strength of sodium hydroxide solution, 2.181 kg of 2,2-(4-hydroxyohenyl)-propane (bisphenol A), 0.137 kg of 2,2-bis-(3,5-dimethyl-4-hydroxyphenyl)-propane and 3 g of p-tert.-butylphenol, as a chain stopper, are initially introduced into a stirred kettle, with intensive stirring and under a nitrogen atmosphere. After the bisphenols have been suspended, 5.1 liters of methylene chloride and 0.57 kg of polyethylene oxide glycol with an average molecular weight of $\overline{M}n$ 8,000 are added. The mixture is then stirred until all of the polyether has dissolved. 2.36 kg of phosgene (150 mol % excess, based on the bisphenols) are now passed in at 15° C. in the course of 100 minutes, whilst about 3.8 liters of 50% strength sodium hydroxide solution are simultaneously metered in, the pH being kept constant at 14. The reaction mixture is introduced into a forced circulation mixer and a solution of 16.2 g of N-ethylpiperidine and 100 ml of methylene chloride is added. After about 45 minutes, a high molecular weight product is obtained, with the pH kept constant at 14. Further working up of the copolymer is effected according to Example 2

The polyether-polycarbonate isolated has a relative viscosity $\eta_{rel}$ of 2.66.

IR analysis shows that the polymer consists of 18.9% by weight of polyether and 81.1% by weight of aromatic polycarbonate.

EXAMPLE 5

Preparation of a stabilised polyether-polycarbonate of 23% by weight of polyethylene oxide glycol ($\overline{M}n$ 8,000), 72% by weight of 2,2-bis-(4-hydroxyphenyl)-propane polycarbonate and 5% by weight of 1,1-bis-(4-hydroxyphenyl)cyclohexane polycarbonate According to Example 1, 1.94 kg of 2,2-bis-(4-hydroxyohenyl)-propane, 0.137 kg of 1,1-bis-(4-hydroxyphenyl)-cyclohexane, 0.69 kg of polyethylene oxide glycol ($\overline{M}n$ 8,000) and 2.245 kg of phosgene are reacted by the phase boundary process, with intensive stirring, and the product is then subjected to a cocondensation reaction with 10.27 g of N-ethylpiperidine.

After the organic phase has been purified (according to Example 1) in a separator until free from electrolytes, the water is removed from the organic phase.

0.3 g (100 ppm) of 1,3,5-tris-(4-tert.-butyl-3-hydroxy-2,5-dimethylbenzyl)-1,3,5-triazine-2,4,6-(1H,3H, 5H)-trione, dissolved in 50 ml of methylene chloride, is added to the organic phase.

The organic solution is concentrated. The polyether-polycarbonate is then dried at 50° C. in a vacuum drying cabinet.

The polyether-polycarbonate isolated has a viscosity $\eta_{rel}$ of 2.47.

EXAMPLE 6

Preparation of a stabilised polyether-polycarbonate of 23% by weight of polyethylene oxide glycol ($\overline{M}n$ 6,000), 72% by weight of 2,2-bis-(4-hydroxyphenyl)-propane and 5% by weight of 1,1-bis-(4-hydroxyphenyl)-cyclohexane polycarbonate According to Example 2, 1.94 kg of 2,2-bis-(4-hydroxyphenyl)-propane, 0.137 kg of 1,1-bis-(4-hydroxyphenyl)-cyclohexane, 0.69 kg of polyethylene oxide glycol ($\overline{M}n$ 6,000) and 2.245 kg of phosgene are reacted by the phase boundary process, with intensive stirring. The product is then subjected to a condensation reaction in a forced circulation mixer by addition of 10.27 g of N-ethylpiperidine, and the cocondensate is washed according to Example 2 until free from electrolytes. 0.3 g (100 ppm) of 1,3,5-tris-(4-tert.-butyl-(3-hydroxy-2,5-dimethylbenzyl)-1,3,5-triazine-2,4,6-(1H,3H,5H)-trione, dissolved in 50 ml of methylene chloride (if appropriate also as a powder), is then added to the paste-like mass. The components are then mixed until the polyether-polycarbonate breaks up into beads. Further working up is effected by grinding and drying in a vacuum drying cabinet at 50° C.

The polyether-polycarbonate isolated has a viscosity $\eta_{rel}$ of 2.76.

EXAMPLE 7

Preparation of a stabilised polyether-polycarbonate of 19% of polyethylene oxide glycol ($\overline{M}n$ 8,000), 76% by weight of 2,2-bis-(4-hydroxyphenyl)-propane polycarbonate and 5% by weight of 1,1-bis-(4-hydroxyphenyl)cyclohexane polycarbonate According to Example 3, 2.047 kg of 2,2-bis-(4-hydroxyphenyl)-propane, 0.137 kg of 1,1-bis-(4-hydroxyphenyl)-cyclohexane, 6 g of p-tert.-butylphenol, 0.57 kg of polyethylene oxide glycol ($\overline{M}n$ 8,000) and 2.36 kg of phosgene are reacted by the phase boundary process, with intensive stirring. The product is then subjected to a cocondensation reaction in a forced circulation mixer by addition of 10.8 g of N-ethylpiperidine and the cocondensate is washed according to Example 2 until free from electrolytes. 0.3 g (100 ppm) of 1,3,5-tris-(4-tert.-butyl-3-hydroxy-2,5-dimethylbenzyl)-1,3,5-triazine-2,4,6(1H,3H,5H)-trione, dissolved in 50 ml of methylene chloride, is then added to the paste-like mass. The components are then mixed until the polyether-polycarbonate breaks up into beads. Further working up is effected by grinding and drying in a vacuum drying cabinet at 50° C.

The polyether-polycarbonate isolated has a viscosity $\eta_{rel}$ of 2.55.

Membrane preparation and testing 12 g of polyether-polycarbonate from the comparison example and Examples 1 to 4 are dissolved in 88 g of 1,3-dioxolane at 70° C., with stirring.

The solution is filtered over a pressure filter and then cooled to room temperature. The solution is drawn onto a glass plate with a doctor blade in a dust-free atmosphere. After 1.7 minutes, the solvent-containing film 100–150 μm thick is placed in distilled water at room temperature.

The membrane formed is kept in water at room temperature for 2 hours.

The permeability for Vitamin $B_{12}$, the ultrafiltration rate (UFR) and the bursting strength are then determined.

The results are summarised in Tables I and II.

The controlled influence of other bisphenols on the crystallisation properties of polyether-polycarbonates of 2,2-bis-(4-hydroxyphenyl)-propane (bisphenol A) and membranes thereof in comparison with those of pure polyether-polycarbonates of bisphenol A, in respect of the fusion enthalpy, is summarised in Table III.

The fusion enthalpies were measured by differential scanning calorimetry (DSC) using a Perkin-Elmer II apparatus.

Table IV shows the stabilising influence, in experiments, of phenolic stabilisers during drying in air at different temperatures and after storage, in comparison with non-stabilised polyether-polycarbonates.

TABLE I

| Flat membrane | Ultrafiltration rate $\left[ UFR = \dfrac{ml}{h \cdot m^2 \cdot mm\ Hg} \right]$ | Differential permeability [Vit. $B_{12}$ = cm/sec] | [Chloride = cm/sec] | Bursting strength [cm Hg] | Thickness [μm] |
|---|---|---|---|---|---|
| Example 1 | $3.3 \times 10^{-3}$ | $1.8 \times 10^{-4}$ | $10.2 \times 10^{-4}$ | 28 | 16 |
| Example 2 | $2.4 \times 10^{-3}$ | $1.3 \times 10^{-4}$ | $9.8 \times 10^{-4}$ | 23 | 17 |
| Example 3 | $2.8 \times 10^{-3}$ | $1.6 \times 10^{-4}$ | $10.8 \times 10^{-4}$ | 25 | 17 |
| Example 4 | $2.5 \times 10^{-3}$ | $1.5 \times 10^{-4}$ | $10.6 \times 10^{-4}$ | 26 | 16 |
| Comparison example | $2.8 \times 10^{-3}$ | $1.6 \times 10^{-4}$ | $9.9 \times 10^{-4}$ | 22 | 18 |

TABLE II

| | Optical appearance of the membrane | | |
|---|---|---|---|
| | Appearance of the membranes after the solvent-containing films have been kept in air for different times before immersion in water | | |
| Product | 0.5 minute | 1.7 minutes | 2.5 minutes |
| Comparison experiment | almost transparent | transparent | transparent |
| Example 1 | " | " | " |
| Example 2 | " | " | " |
| Example 3 | " | " | " |
| Example 4 | " | " | " |

TABLE III

| | Fusion enthalpy of the crude product [J/g] | Fusion enthalpy of the membrane after preparation [J/g] | Fusion enthalpy of the membrane after storage for 2 months [J/g] |
|---|---|---|---|
| Polyether-polycarbonates of bisphenol A PC and 5% by weight of another bisphenol PC | | | |
| Example 1 | 6.6 | 0.3 | 0.3 |
| Example 2 | 2.9 | 0.2 | 0.25 |
| Example 3 | 4.1 | 0.25 | 0.3 |
| Example 4 | 4.8 | 0.25 | 0.3 |
| Comparison experiment | 14.7 | 2.0 | 2.4 |
| Polyether-polycarbonates of pure bisphenol A PC* | | | |
| Comparison to Example 1 | 11.8 | 0.9 | 1.4 |
| Comparison to Example 2 | 10.7 | 0.8 | 1.1 |
| Comparison to comparison experiment | 24.2 | 3.0 | 3.5 |

*These comparison examples were prepared according to German Patent Application P 33 29 975.7 of 19.8.83.

TABLE IV

| | | Experiments on the stabilisation of polyether-polycarbonates | | | | |
|---|---|---|---|---|---|---|
| | | Drying 1 (24 hours with air at 50° C.) | Drying 2 (24 hours with air at 90° C.) | after storage for 2 months at 25° C. | | |
| | | | | Drying 1 | | Drying 2 | |
| Example | Stabilisers [ppm] | $[\eta_{rel}]$ | $[\eta_{rel}]$ | $[\eta_{rel}]$ | Formalin odour | $[\eta_{rel}]$ | Formalin odour |
| 1 | — | 2.36 | 2.21 | 2.28 | no odour | 2.08 | slight odour |
| 2 | — | 2.64 | 2.42 | 2.56 | no odour | 2.24 | slight odour |
| 3 | — | 2.35 | 2.16 | 2.24 | slight odour | 1.98 | odour |
| 5 | 100 (A) | 2.45 | 2.39 | 2.43 | no odour | 2.37 | no odour |
| 6 | 100 (A) | 2.76 | 2.72 | 2.75 | " | 2.69 | " |
| 7 | 100 (A) | 2.54 | 2.51 | 2.55 | " | 2.48 | " |
| 7a | 200 (A) | 2.55 | 2.52 | 2.56 | " | 2.50 | " |
| 7b | 100 (B) | 2.45 | 2.40 | 2.45 | " | 2.38 | " |
| 7c | 200 (B) | 2.48 | 2.45 | 2.48 | " | 2.40 | " |
| 7d | 100 (C) | 2.50 | 2.46 | 2.49 | " | 2.45 | " |

TABLE IV-continued

Experiments on the stabilisation of polyether-polycarbonates

| Example | Stabilisers [ppm] | Drying 1 (24 hours with air at 50° C.) [$\eta_{rel}$] | Drying 2 (24 hours with air at 90° C.) [$\eta_{rel}$] | after storage for 2 months at 25° C. | | | |
|---|---|---|---|---|---|---|---|
| | | | | Drying 1 | | Drying 2 | |
| | | | | [$\eta_{rel}$] | Formalin odour | [$\eta_{rel}$] | Formalin odour |
| 7e | 200 (C) | 2.51 | 2.48 | 2.51 | " | 2.47 | " |

A = 1,3,5-tris-(4-tert.-butyl-3-hydroxy-2,5-dimethylbenzyl)-1,3,5-triazine-2,4,6-(1H,3H,5H)-trione
B = 2-tert.-butyl-4-methoxyphenol
C = 3-(3,5-di-tert.-butyl-4-hydroxyphenyl)-propionate

We claim:

1. A process for the preparation of a membrane comprising:

(A) preparing a segmented aliphatic-aromatic polyether-copolycarbonate having a weight average molecular weight of 50,000 to 350,000 and containing about 95 to about 65% by weight of aromatic carbonate structural units of the formula (I)

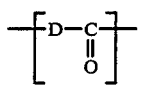
(I)

wherein
—D— is a diphenolate radical, and about 5% to about 35% by weight of polyether carbonate structural units of the general formula (II)

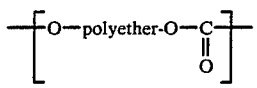
(II)

wherein
—O— polyether—O— is an aliphatic polyether-diolate radical having a number average molecular weight of 600 to 20,000 by the reaction in the phase boundary process in a mixture of organic solvent and aqueous alkaline phase at a temperature of from 0° C. to 35° C., of corresponding amounts of an aliphatic polyether diol having a number average molecular weight of 600 to 20,000, a mixture of aromatic dihydroxy compounds and a carbonic acid halide wherein (a) the carbonic acid halide is used in a molar excess based on the total number of mols of said aromatic dihydroxy compounds and aliphatic polyether diol, said aromatic dihydroxy compounds comprising 50 to 99% by weight of bisphenol-A and 50 to 1% by weight of at least one other diphenol, (b) the aqueous phase is maintained at a pH of at least 13, and (c) the polycondensation reaction is carried out in a reactor and is catalyzed by an amine catalyst, the polyether-polycarbonate being isolated, purified, and dried, (B) dissolving said segmented-aromatic polyether copolycarbonate in a water-miscible organic solvent in an amount of 12% by weight, based on the weight of the solution, (C) filtering said solution, (D) casting on a smooth surface a film having a wet coating thickness of about 150 μm to 240 μm, (E) evaporating off at least some of said solvent and (F) hydrating said film in demineralized water.

2. The polyether polylcarbonate membrane prepared by the process of claim 1.

3. A process for the preparation of a membrane comprising:

(A) preparing a segmented aliphatic-aromatic polyether-copolycarbonate having a weight average molecular weight of 50,00 to 350,000 and containing about 95 to about 65% by weight of aromatic carbonate structural units of formula (I)

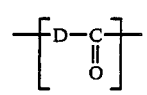
(I)

wherein
—D— is a diphenolate radical, and about 5% to about 35% by weight of polyether carbonate structural units of the general formula (II)

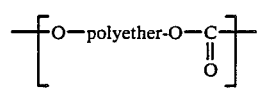
(II)

wherein
—O— polyether—O— is an aliphatic polyether-diolate radical having a number average molecular weight of 600 to 20,000 by the reaction in the phase boundary process in a mixture of organic solvent and aqueous alkaline phase at a temperature of from 0° C. to 35° C., of corresponding amounts of an aliphatic polyether diol having a number average molecular weight of 600 to 20,000, a mixture of aromatic dihydroxy compounds and a carbonic acid halide
wherein (a) the carbonic acid halide is used in a molar excess based on the total number of mols of said aromatic dihydroxy compounds and aliphatic polyether diol, said aromatic dihydroxy compounds comprising 50 to 99% by weight of bisphenol-A and 50 to 1% by weight of at least one other diphenol, (b) the aqueous phase is maintained at a pH of at least 13, and (c) the polycondensation reaction is carried out in a reactor and is catalyzed by an amine catalyst, the polyether-polycarbonate being isolated, purified, and dried, (B) dissolving said segmented-aromatic polyether copolycarbonate in a water-miscible organic solvent in an amount of 12–20% by weight, based on the weight of the solution, (C) filtering said solution, (D) casting on a smooth surface a film having a wet coating thickness of about 150 μm to 240 μm, (E) evaporating off at least some of said solvent and (F) hydrating said film in demineralized water.

4. The polyether polycarbonate membrane prepared by the process of claim 3.

* * * * *